(No Model.)
R. M. HUNTER.
ELECTRIC RAILWAY.
No. 428,211. Patented May 20, 1890.
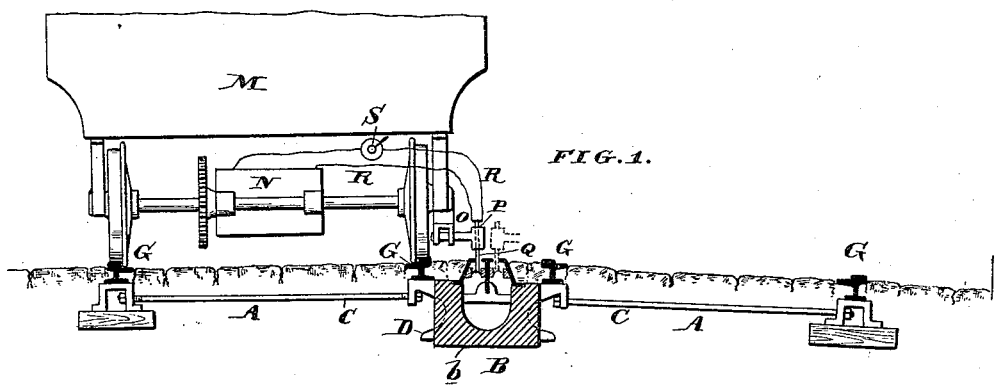
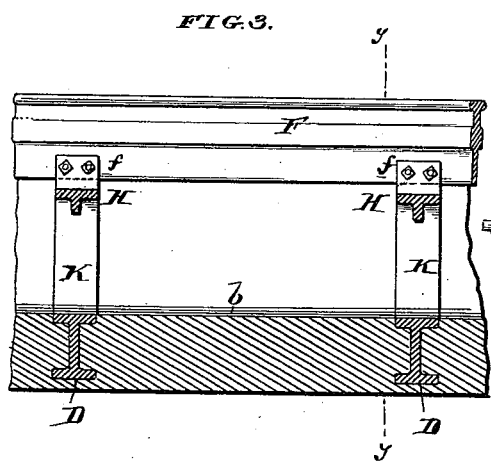
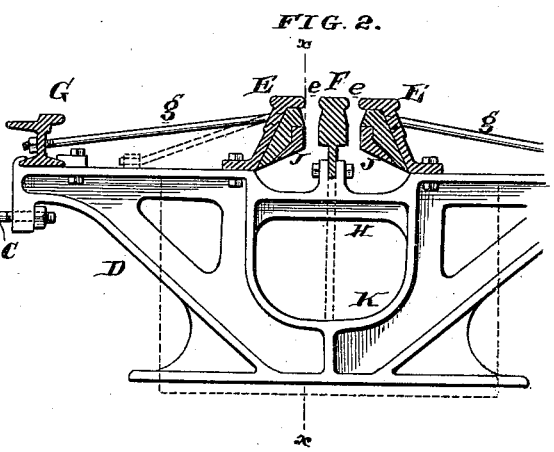
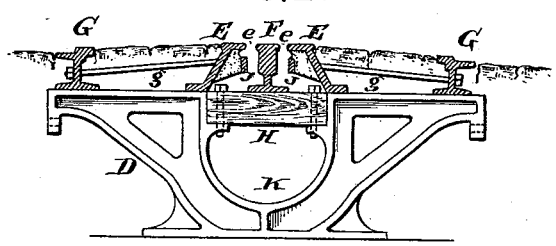
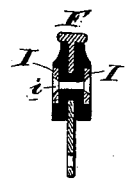
WITNESSES:
INVENTOR:

UNITED STATES PATENT OFFICE.

RUDOLPH M. HUNTER, OF PHILADELPHIA, PENNSYLVANIA, ASSIGNOR, BY MESNE ASSIGNMENTS, TO THE THOMSON-HOUSTON ELECTRIC COMPANY, OF BOSTON, MASSACHUSETTS.

ELECTRIC RAILWAY.

SPECIFICATION forming part of Letters Patent No. 428,211, dated May 20, 1890.

Original application filed December 15, 1888, Serial No. 293,665. Divided and this application filed May 21, 1889. Serial No. 311,631. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements, fully set forth in the following specification, and shown in the accompanying drawings, which form part thereof.

This application (Case 97) is a division of my application, Serial No. 293,665, filed December 15, 1888.

My invention contemplates the employment of a common conduit structure arranged between the two railway-tracks. By this construction the collector is arranged upon the outside of the wheel-base and preferably supported by the axle-boxes or axles and independent of the car-body, which in practice is supported on springs. The conduit may have one or two slots and one or two pairs of conductors, which may be insulated from the conduit; or, if preferred, one of the conductors may be electrically connected with the conduit and tracks.

It is immaterial to my invention whether the conduit has more than one slot and more than one conductor, though I prefer it to be made with two slots and two pairs of conducting-surfaces. In this connection I find it desirable to arrange the slots of the conduit at the highest parts of the road-bed and let the tracks slope away upon either side, so as to cause the water and slush to run to the gutters of the street, and thereby keep the conduit clean. The conduit structure may be formed in any suitable manner, though I prefer to make it of cast-iron yokes supporting the slot-irons and adjacent rails of the two tracks and filled in with concrete or masonry. The outer rails may be tied to the yokes or their rails, and thus be prevented from spreading.

I do not limit myself to the details set out in this specification, as they may be greatly modified without departing from the spirit of my invention.

In the drawings, Figure 1 is a cross-section of a two-track electric railway embodying my invention. Fig. 2 is a cross-section of the conduit. Fig. 3 is a longitudinal section of Fig. 2 on line $x$ $x$. Fig. 4 is a cross-section of a modified form of conduit, and Fig. 5 is a detail of part of the slot-irons and attached conductors.

A A are the two tracks having the rails G. These tracks are separated a short distance and slope slightly away to each side, so as to cause the rain-water and slush to run from their adjacent parts toward the gutters of the street.

B is a conduit, of any suitable construction, arranged between the adjacent rails of the two tracks. As shown, it is formed of cast-iron yokes D, which are more or less U-shaped, and support not only the slot-irons E E and F, but also support the adjacent rails G of the two tracks. The outer or more distant rails of the two tracks are tied to the conduit-yokes and thus to the inner rails by tie-rods C C. The slot-irons E approach a central slot-iron F of T shape supported on a cross-bracket H in the yoke, and are held in adjustment by being tied to the rails G, as shown at $g$, or to the yokes direct, as indicated in dotted lines in Fig. 2. The positive conductors J are supported by the slot-irons E, from which they are suitably insulated. The conductors I are either made integral with the slot-iron F, as shown in Figs. 2 and 4, or electrically separate therefrom, as indicated in Fig. 5, in which L represents the insulation, and $i$ a rivet for uniting the conductors I on each side of the slot-iron.

In Fig. 2 the slot-iron F and its conductors I are electrically connected with the yokes D and rails G, and the entire iron structure acts as the return to the central station. In Fig. 4 the central slot-rail F and its conductors are insulated from the conduit and rails.

The conduit proper is formed of cement or concrete or masonry $b$, which extends from yoke to yoke and through and around them, forming a monolithic structure.

It is evident that the form of conduit shown has two upper compartments containing the electrical conductors and a single lower or drainage compartment common to both of the electrical or upper compartments. I, however, do not confine myself to this construction, as the conduit may be divided longitudinally, as indicated in dotted lines in Fig. 2, forming two drainage conduits or compartments. It is also clear that in place of a double conduit a single conduit may be employed upon the outside of the track-bed of the railway, and this conduit may have one or more conductors and the rails may act as returns.

M represents the electrically-propelled car having the propelling electric motor N. The collector Q, which extends down into the conduit through the slot thereof, is supported by the frame P, free to move laterally in a guide O, secured to the axle-box or axle of the car and preferably independent of the car-body, which should be supported upon springs. R is the motor-circuit, and S is the electric regulator. This collector is upon the outside of the car and on the side adjacent to the parallel track which acts as the return-track for the car, and such collector is free to move laterally to compensate to any inequalities in the slots or their parallelism with respect to the track. This collector may be made in various ways.

Having now described my invention, what I claim as new, and desire to secure by Letters Patent, is—

1. The combination of two tracks with a slotted conduit arranged between them and one or more electrical conductors arranged within the conduit.

2. The combination of two tracks with a slotted conduit arranged between them and one or more electrical conductors arranged within the conduit and insulated therefrom.

3. The combination of a slotted conduit having iron yokes with two tracks in which the adjacent rails of each track are secured to the conduit-yokes.

4. The combination of two railway-tracks with a conduit arranged between them, having two slots, and an insulated electrical conductor corresponding to each slot.

5. The combination of two railway-tracks with a conduit arranged between the adjacent rails, said conduit having two slots and two compartments in its upper part, and a bared electric conductor in each of said compartments and insulated from the conduit.

6. The combination of two railway-tracks, a slotted conduit arranged between them, an electric conductor within said conduit, a traveling vehicle, and a current-collecting device carried by the vehicle outside of its wheel-base and making contact with the conductor within the conduit.

7. An electric-railway conduit having two slots parallel to each other and an electric conductor within the conduit and corresponding to each slot.

8. An electric-railway conduit having two separate compartments having slots opening into the street parallel to each other, and an insulated electric conductor within each compartment.

In testimony of which invention I have hereunto set my hand.

RUDOLPH M. HUNTER.

Witnesses:
ERNEST HOWARD HUNTER,
S. T. YERKES.